United States Patent
Yao et al.

(10) Patent No.: US 11,100,412 B2
(45) Date of Patent: Aug. 24, 2021

(54) EXTENDING QUESTION AND ANSWER SAMPLES

(71) Applicant: Advanced New Technologies Co., Ltd., Grand Cayman (KY)

(72) Inventors: Kaisheng Yao, Hangzhou (CN); Jiaxing Zhang, Hangzhou (CN); Jia Liu, Hangzhou (CN); Xiaolong Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/818,927

(22) Filed: Mar. 13, 2020

(65) Prior Publication Data

US 2021/0027177 A1    Jan. 28, 2021

Related U.S. Application Data

(63) Continuation of application No. PCT/CN2020/071975, filed on Jan. 14, 2020.

(30) Foreign Application Priority Data

Jul. 22, 2019    (CN) .......................... 201910662208.2

(51) Int. Cl.
*G06F 16/90* (2019.01)
*G06F 15/17* (2006.01)
(Continued)

(52) U.S. Cl.
CPC ............... *G06N 5/04* (2013.01); *G06F 7/588* (2013.01)

(58) Field of Classification Search
CPC .................................. G06N 5/04; G06F 7/588
(Continued)

(56) References Cited

U.S. PATENT DOCUMENTS

2006/0136208 A1    6/2006    Chung et al.
2008/0069437 A1*   3/2008    Baker .................. G06K 9/6256
                                                          382/159
(Continued)

FOREIGN PATENT DOCUMENTS

CN        101621391        1/2010
CN        106547734        3/2017
(Continued)

OTHER PUBLICATIONS

PCT International Search Report and Written Opinion in International Application No. PCT/CN2020/071975, dated Apr. 22, 2020, 13 pages (with partial machine translation).
(Continued)

*Primary Examiner* — Brandon S Cole
(74) *Attorney, Agent, or Firm* — Fish & Richardson P.C.

(57) ABSTRACT

Implementations of the present specification provide a method and an apparatus for extending question and answer samples. According to the method, a random number is generated for each existing sample, a question is blurred for a sample whose random number belongs to sample extension random numbers, to generate an extended sample, so that an overall sample blurring extension rate can be effectively controlled. In addition, for a sample needing blurring extension, a question is extended by deleting a word with a predetermined part of speech in the corresponding question, and then an extended sample is generated based on an extended question, so that more question expression ways are compatible. As such, a question and answer model is trained by using a sample set to which extended samples are added, so that an answer can be provided to a user more effectively.

20 Claims, 4 Drawing Sheets

(51) Int. Cl.
*G06F 7/00* (2006.01)
*G06Q 50/24* (2012.01)
*G06N 5/04* (2006.01)
*G06F 7/58* (2006.01)

(58) Field of Classification Search
USPC .................................................. 706/1–62
See application file for complete search history.

(56) References Cited

U.S. PATENT DOCUMENTS

| | | | | |
|---|---|---|---|---|
| 2008/0177994 | A1* | 7/2008 | Mayer | G06F 9/4418 713/2 |
| 2013/0226556 | A1 | 8/2013 | Hwang et al. | |
| 2013/0226613 | A1* | 8/2013 | Srinivasan | G06Q 50/24 705/3 |
| 2013/0268260 | A1* | 10/2013 | Lundberg | G06F 40/40 704/8 |
| 2016/0062735 | A1 | 3/2016 | Wilber | |
| 2017/0193086 | A1* | 7/2017 | Zeng | G06N 5/04 |
| 2019/0065576 | A1* | 2/2019 | Peng | G06F 16/22 |
| 2019/0104121 | A1* | 4/2019 | Khandani | H04L 9/0891 |

FOREIGN PATENT DOCUMENTS

| | | |
|---|---|---|
| CN | 106599317 | 4/2017 |
| CN | 107798140 | 3/2018 |
| CN | 109241258 | 1/2019 |
| CN | 109241286 | 1/2019 |
| CN | 110413753 | 11/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

EXTENDING QUESTION AND ANSWER SAMPLES

CROSS-REFERENCE TO RELATED APPLICATIONS

This application is a continuation of PCT Application No. PCT/CN2020/071975, filed on Jan. 14, 2020, which claims priority to Chinese Patent Application No. 201910662208.2, filed on Jul. 22, 2019, and each application is hereby incorporated by reference in its entirety.

TECHNICAL FIELD

One or more implementations of the present specification relate to the field of computer technologies, and in particular, to methods and apparatuses for extending question and answer samples by using a computer.

BACKGROUND

With the development of artificial intelligence, intelligent question and answer systems are increasingly widely used for customer relations and other uses.

SUMMARY

One or more implementations of the present specification describe methods and apparatuses, to perform some blurring processing on a question in a sample in the process of training an intelligent question and answer model, so that a question and answer system is more compatible with various ways of asking a question, and the question and answer model can be more effective.

According to a first aspect, a method for extending question and answer samples is provided, where the question and answer samples include a first sample, the first sample includes a first question and a pre-marked first answer, and the method includes the following: performing syntax analysis on the first question to determine a part of speech corresponding to each word in the first question; generating a random number within a predetermined range for the first sample, and detecting whether the generated random number belongs to selected sample extension random numbers, where the sample extension random numbers are values selected from the predetermined value range and are used to select a corresponding sample from the question and answer samples for extension; when the generated random number belongs to the sample extension random numbers, deleting a word with a predetermined part of speech in the first question to generate at least one extended question; and generating an extended sample based on the at least one extended question and the first answer.

In an implementation, a proportion of a quantity of sample extension random numbers to a quantity of values within the predetermined value range is predetermined.

In an implementation, the deleting a word with a predetermined part of speech in the first question includes the following: deleting any one of words with the predetermined part of speech from the first question.

In an implementation, the part of speech of a word includes at least one of the following: a noun, a verb, a verb phrase, and an interrogative.

In an implementation, the predetermined part of speech includes one of a noun and an interrogative.

In an implementation, the generating an extended sample based on the at least one extended question and the first answer includes the following: combining each extended question with the first answer to generate each extended sample.

In an implementation, extended questions extended from the first question include a first extended question, and the generating an extended sample based on the at least one extended question and the first answer includes the following: detecting whether other extended questions of the question and answer samples include an extended question the same as the first extended question; and if there is an extended question the same as the first extended question, marking a first extended answer for the first extended question based on a predetermined template to generate a first extended sample.

According to a second aspect, an apparatus for extending question and answer samples is provided, where the question and answer samples include a first sample, the first sample includes a first question and a pre-marked first answer, and the apparatus includes the following: an analysis unit, configured to perform syntax analysis on the first question to determine a part of speech corresponding to each word in the first question; a detection unit, configured to generate a random number within a predetermined range for the first sample, and detect whether the generated random number belongs to selected sample extension random numbers, where a range of the extension random numbers is included in the predetermined value range, and the extension random numbers are used to select a corresponding sample from the question and answer samples for extension; an extension unit, configured to: when the generated random number belongs to the sample extension random numbers, delete a word with a predetermined part of speech in the first question to generate at least one extended question; and a generation unit, configured to generate each extended sample based on the at least one extended question and the first answer.

According to a third aspect, a computer-readable storage medium is provided, where the computer-readable storage medium stores a computer program, and a computer performs the method according to the first aspect when the computer program is executed on the computer.

According to a fourth aspect, a computing device is provided, where the computing device includes a memory and a processor, the memory stores executable code, and the processor implements the method according to the first aspect when executing the executable code.

According to the method and the apparatus provided in the implementations of the present specification, a random number is generated for each existing sample, a question is blurred for a sample whose generated random number belongs to sample extension random numbers, to generate an extended sample, so that an overall sample blurring extension rate can be effectively controlled. In addition, for a sample needing blurring extension, a question is extended by deleting a word with a predetermined part of speech in the corresponding question, and then an extended sample is generated based on an extended question, so that more question expression ways are compatible. As such, the question and answer model is trained by using a sample set to which extended samples are added, so that an answer can be provided to a user more effectively.

BRIEF DESCRIPTION OF DRAWINGS

To describe the technical solutions in the implementations of the present disclosure more clearly, the following briefly introduces the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
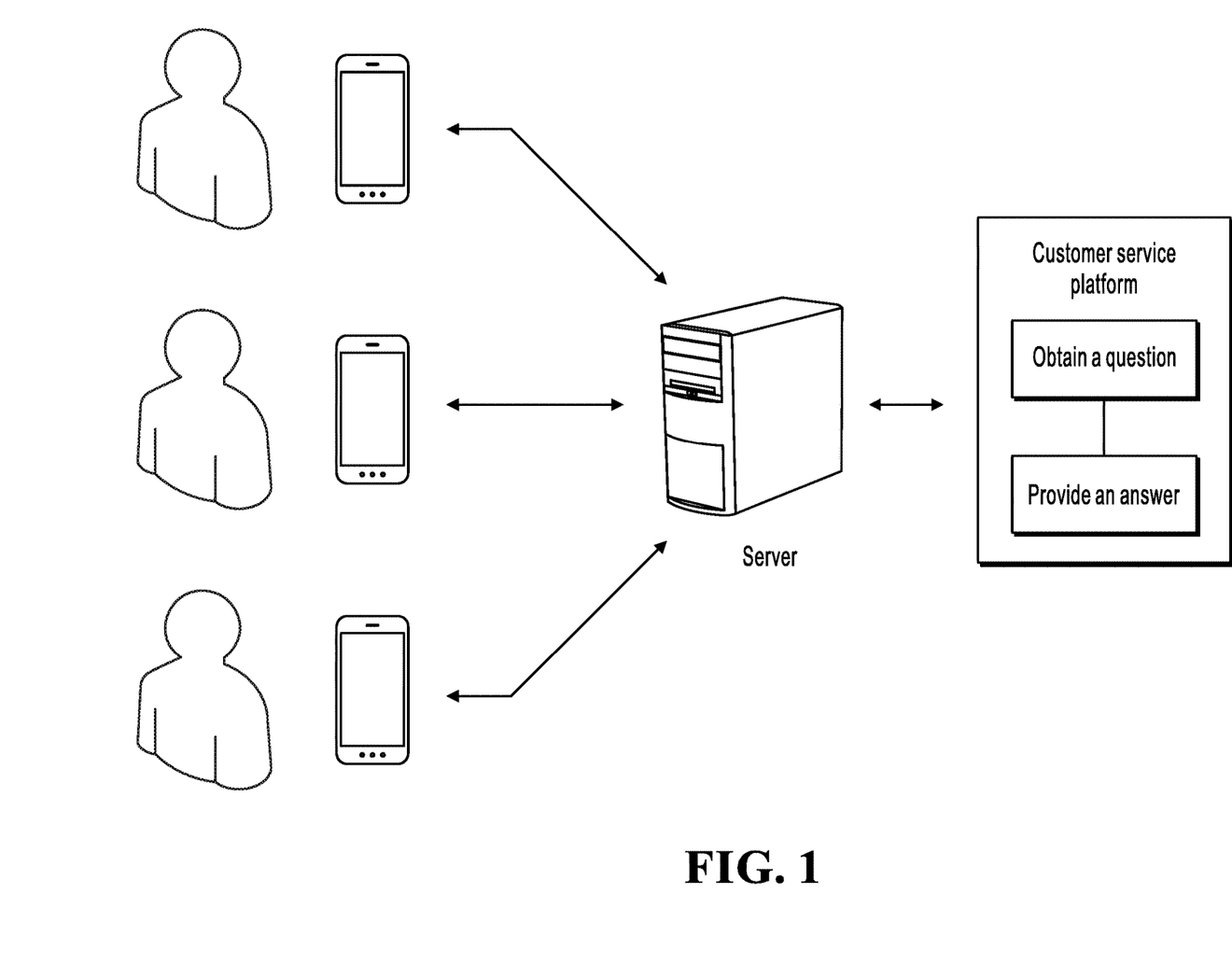
FIG. 1 is a schematic diagram illustrating an implementation scenario of an implementation disclosed in the present specification.

For ease of description, a specific application scenario shown in FIG. 1 in the implementations of the present specification is described. FIG. 1 is a schematic diagram illustrating an implementation scenario of an implementation disclosed in the present specification. In the implementation scenario, a user can interact with a corresponding application server by using various applications on an end-user device, so as to use functions provided by the applications. Here, the end-user device can be a hardware device such as a computer, a tablet, or a smartphone. The applications running on the end-user device are, for example, a shopping application, a payment application, and a map application. These applications can be separately served by the corresponding server. It is worthwhile to note that a quantity of end-user devices and a quantity of application servers here are merely examples, and any quantity can be set in a real architecture. Implementations are not limited here.

The server can further set a customer service platform for the applications on the end-user device. The customer service platform can be disposed inside the server, or can be disposed in another device connected to the server. Implementations are not limited here. The customer service platform is often used to alleviate various problems that the user encounters when using the applications, for example, a payment application fails in payment but shows that deduction succeeds, or how to repay by using a loan application. The customer service platform can obtain questions raised by users and provide answers for the users. In the process of providing the answers to the user questions, the customer service platform needs to identify the real intention included in the user questions before providing more accurate answers satisfying user requirements.

It can be understood that users have different expression ways and expression habits when raising questions. For example, "How to enable HUABEI(Ant Credit Pay)" may be expressed in the following ways: "How to use HUABEI", and "if I want to enable HUABEI, how do I enable". Therefore, in services provided by the customer service platform, how to identify real questions in various expression styles is the key to providing accurate answers.

Classification models can be used to determine answers to questions raised by users. For example, in the field of intelligent customer services, when a user raises a question, the intelligent question and answer system can automatically perform semantic analysis on the user question and provide an answer for the user. In some technologies, user questions are classified based on a classification model. However, because users have different cognition levels and expression ways, the difficulty of training the classification model increases. In the process of using the classification model, different syntax and expression habits affect accuracy of answers provided for user questions.

The implementations of the present specification provide a way improve the accuracy of model classification. By extending an existing sample, more samples including blurred questions are obtained, to train a model, thereby improving the accuracy of the classification model.

The following first describes a sample extension method.

Figure 2:
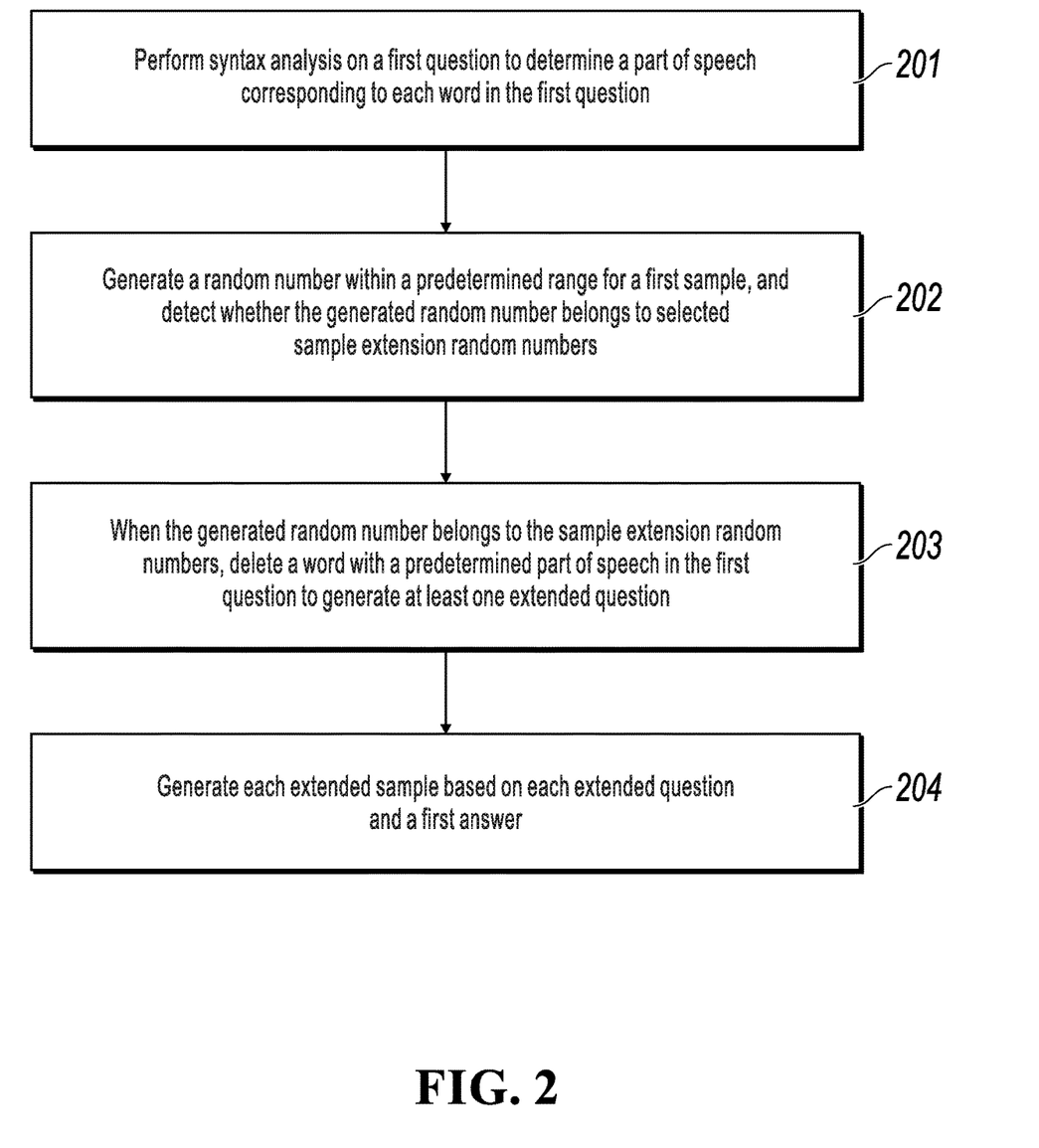
FIG. 2 is a flowchart illustrating a method for extending question and answer samples according to an implementation.

FIG. 2 is a flowchart illustrating a method for extending question and answer samples through blurring according to an implementation. The method can be performed by any system, device, apparatus, platform, or server having computing and processing capabilities. The question and answer samples typically include questions and pre-marked answers. Optionally, in a known question and answer sample, a corresponding question can be a standard question clearly expressing what the question is, and corresponds to a determined answer (the answer can be expressed in multiple ways, which is not limited here). Assuming that any sample in a known question and answer sample is a first sample, the first sample can correspond to a first question and a first answer. The first sample is used as an example. As shown in FIG. 2, the method for extending question and answer samples can include the following steps: Step 201: Perform syntax analysis on the first question to determine a part of speech corresponding to each word in the first question. Step 202: Generate a random number within a predetermined range for the first sample, and detect whether the generated random number belongs to selected sample extension random numbers, where the sample extension random numbers are values selected from the predetermined value range and are used to select a corresponding sample from the question and answer samples for extension. Step 203: When the generated random number belongs to the sample extension random numbers, delete a word with a predetermined part of speech in the first question to generate at least one extended question. Step 204: Generate each extended sample based on each extended question and the first answer.

First, in step 201, syntax analysis is performed on the first question to determine the part of speech corresponding to each word in the first question. It can be understood that the first question is usually a sentence with clear semantics, and a sentence usually has a specified syntax structure. For example, an affirmative sentence can include a subject, a predicate, an object, and can further include sentence constituents such as an attribute, an adverbial, and a complement. These sentence constituents can be implemented by words or phrases. Words correspond to different parts of speech based on corresponding sentence constituent. Syntax analysis is an analysis method that uses the syntax of natural language and other knowledge to determine each constituent of a sentence. In the present step, syntax analysis can be first performed on the first question to determine each word in the sentence, constituents of the words in the sentence, an attachment relationship between the words, etc.

Figure 3:
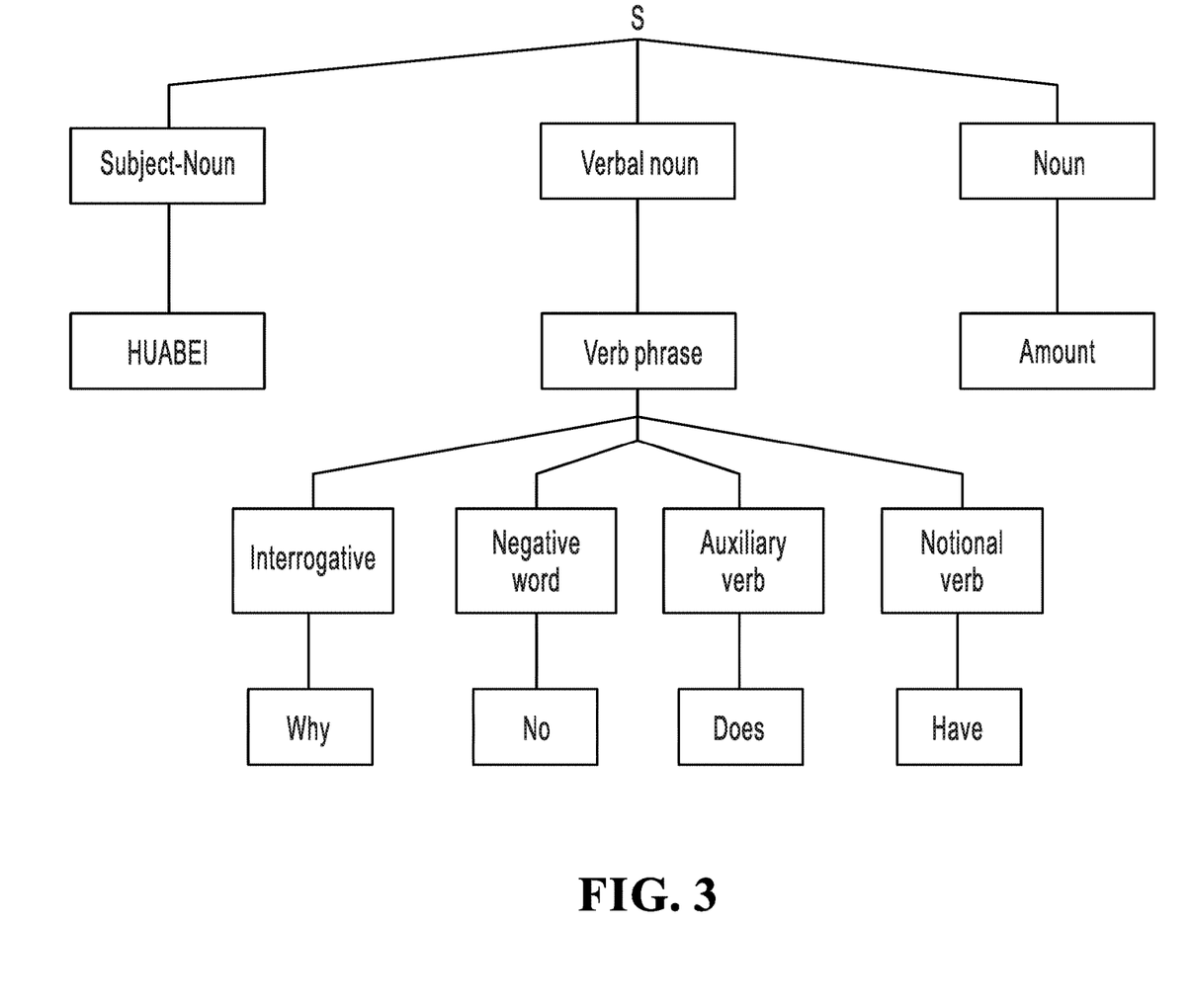
FIG. 3 is a schematic diagram of syntax analysis on a first question in a specific example.

Syntax analysis can be performed on the first question by using various natural language syntax analysis applications or algorithms such as a top-bottom analysis algorithm LL(1), context-free grammar, and a syntax tree prediction algorithm. During syntax analysis on the first question, words can be segmented, parts of speech can be marked, word relationships can be understood, etc. As shown in FIG. 3, assuming that first question S is "why does HUABEI have no amount", words "why", "does", "HUABEI", "have", "no", and "amount" can be obtained after word segmentation. Part of speech marking and word relationships are shown in FIG. 3. "Why" is an interrogative, "does" is an auxiliary verb, "HUABEI" is a subject-Noun, "have" is a notional verb, "no" is a negative word, and "amount" is a noun. So far, the syntax analysis on the first question "Why does HUABEI have no amount" is completed.

It can be understood that the method for extending question and answer samples is described by using an extension process using the "first sample" as an example. In the process, a question in a sample is blurred by deleting a word with a predetermined part of speech. For existing samples, in a batch extension process, if blurring extension is performed on each question, the standard of the samples may be affected. For example, for two different questions, two same questions are obtained after blurring extension is performed, and corresponding answers are different, which is equivalent to diversification of sample labels corresponding to the same question, affecting accuracy of a question and answer model trained by using samples. In the process of performing blurring extension on question and answer samples, question and answer samples of a specified proportion can be randomly selected, to ensure that samples that have been extended through blurring produce as little impact as possible to the question and answer model.

Therefore, random numbers of a specified quantity can be determined in advance, these random numbers fall within a predetermined value range, and a random number is randomly generated for each existing standard question and answer sample. Values within the predetermined value range are far less than the samples, so that operation complexity can be reduced. Further, some values can be selected from the values within the predetermined value range as sample extension random numbers, and filtering is performed on the generated random number by using the sample extension random numbers, so that whether to extend a corresponding sample is determined. In a specific implementation, blurring extension can be performed only on a question and answer sample whose random number correspondingly generated belongs to the sample extension random numbers. For example, if 256 random numbers 0 to 255 are determined in advance, and the sample extension random numbers are values of 0 to 99, it is determined to perform blurring extension on a question and answer sample when a random number generated for the corresponding sample is any one of the 100 values. Optionally, a proportion of a quantity of sample extension random numbers to a quantity of values within the predetermined value range (i.e., a range of generated random numbers) can be predetermined (for example, 20%). For example, among random numbers 0 to 255, the sample extension random numbers are a total of 51 random numbers, for example, 0 to 50, 50 to 100, 105 to 155, or 205 to 255. There is the same probability that a random number generated for each sample falls within the predetermined value range. Therefore, by adjusting the quantity of sample extension random numbers, a proportion of samples to be extended through blurring can be controlled.

Specifically, for the first sample, in step 202, the random number within the predetermined range is generated for the first sample, and it is detected whether the generated random number falls within the selected extension random number range. A method for generating a random number is not limited here. For example, when a random number range is from 0 to 256, a random number can be determined by randomly assigning "0" or "1" to eight binary digits. For example, "11010100" corresponds to a random number "212". Further, it can be detected whether the random number belongs to the selected sample extension random numbers, for example, any value in 0 to 100. When the random number belongs to the sample extension random numbers, the first question is blurred to extend the first sample. Otherwise, the first sample is not extended.

In step 203, when the generated random number falls within the range of the extension random numbers, the word with the predetermined part of speech in the first question is deleted to generate the at least one extended question. As described above, if the random number generated for the first question belongs to the sample extension random numbers, it is determined to perform blurring extension on the first question. In this implementation of the present specification, the first question is extended by deleting the word with the predetermined part of speech in the first question.

Here, the word with the predetermined part of speech can be a word in a sentence that is easily ignored in oral expression or can be replaced with a relatively large quantity of words, for example, a noun (a subject or an object) or an interrogative.

When the predetermined part of speech is a noun, the noun can be a word related to the current service. When a question is raised for the current service, a user may omit a service word related to the current service from question descriptions of natural language. Therefore, the service word can be blurred. For example, if the first question is "Why does HUABEI have no amount", "HUABEI" is a related service word. In terms of questions involved in the "HUABEI" service, a user may raise the question of "Why is there no amount" in the service scenario.

The interrogative is usually expressed in various ways. For example, "why" can be expressed by "because of what" or "for what reason". Therefore, the interrogative can be blurred. The interrogative is usually at the beginning of the sentence, expressed with helping verb, or expressed at the end of the sentence, for example, "How to enable HUABEI" (at the beginning of the sentence), "does HUABEI have no amount" (helping verb), and "if I repay late for HUABEI?" (at the end of the sentence). It can be seen that the interrogative is often not a key word in a question, and usually does not affect semantic expression. For example, "enable HUABEI", "HUABEI has no amount", and "repay late for HUABEI" are obtained when interrogatives are deleted from the questions in the previous examples.

In more service scenarios, the predetermined part of speech can be another part of speech. Details are not listed here. Words with the predetermined part of speech can be pre-specified specific words, for example, "HUABEI" and "how", added to a predetermined word set, or can be only words with a specified part of speech.

It can be understood that in a question and answer scenario, a length of a question is usually relatively short, and the question can include one sentence or several phrases. If too many words are deleted, the question may not be expressed. For example, if you delete two nouns "HUABEI" and "amount" in "Why does HUABEI have no amount", the question becomes "Why does have no". Therefore, in an optional implementation, a quantity of to-be-deleted words can be limited, for example, 1.

By deleting the word with the predetermined part of speech, the first question can be extended into at least one extended question through blurring. For example, a noun and an interrogative in "How to enable HUABEI" are separately deleted, to obtain at least two extended questions "How to enable" and "to enable HUABEI".

Then, in step 204, the extended sample is generated based on the at least one extended question and the first answer. It can be understood that in a question and answer system, a question provided by a user can be expressed in an unpredictable expression way, and the purpose of extending the first question in the first sample is to be compatible with more question expression ways, and an answer provided for the same question can be fixed. Therefore, after the first question is blurred, the extended sample can be generated based on the extended question obtained through blurring and the corresponding first answer.

According to an implementation, a label of the extended questions of the first question is still the first answer. Therefore, each extended question of the first question and the first answer can be combined to generate extended samples of the first sample.

In practice, the same question may be generated after questions corresponding to different standard samples are extended through blurring. For example, "How to enable HUABEI" and "How to enable JIEBEI" both become "How to enable" after nouns are deleted. In this case, according to another implementation, after each standard sample is extended, each extended question can be further detected to determine whether the extended questions include the same extended question. Another extended answer or a corresponding label can be marked for the same extended question based on a predetermined template. For example, the predetermined template can be an option for a user to further confirm the question. For example, an extended answer (a label) can be marked for an extended question "How to enable":

"Your question is:
1. How to enable HUABEI
2. How to enable JIEBEI

Click the above question to confirm, or reply with a corresponding number to confirm your question."

As such, the predetermined template for further confirming the question is used to obtain an answer to an extended question that is ambiguous after extension, so that the situations that answers to a certain question obtained after blurring extension are not unique are reduced, thereby ensuring accuracy of a question and answer model trained by using training samples to which extension samples are added.

As such, each known standard sample can be extended based on the process shown in FIG. 2. An extended sample and a standard sample are added to a sample set together to train the question and answer model, so that the question and answer model is more compatible with user question expression ways, thereby improving effectiveness of the question and answer model. It can be understood that, because whether each sample is to be extended is controlled by using a random number and sample extension random numbers, only some samples of a controllable quantity are extended through blurring, which does not affect accuracy of the question and answer model.

In the previously described process, the first sample corresponding to the first question and the first answer is used as an example to perform blurring extension on a question for question and answer sample training that is associated with the question and answer model. First, syntax analysis is performed on the first question to determine words and parts of speech of the words in the first question. Then, the random number is generated within the predetermined range for the first question, and it is detected whether the generated random number belongs to the selected sample extension random numbers. When the generated random number belongs to the sample extension random numbers, the word with the predetermined part of speech in the first question is deleted to generate the at least one extended question. Finally, each extended sample is generated based on each extended question and the first answer. In the sample extension process, because whether a sample needs to be extended is determined by using a random number, an overall sample blurring extension rate can be effectively controlled. In addition, the first question is extended by deleting the word with the predetermined part of speech, so that more question expression ways are compatible. The question and answer model is trained by using a sample set to which extended samples are added, so that an answer can be provided to a user more effectively.

Figure 4:
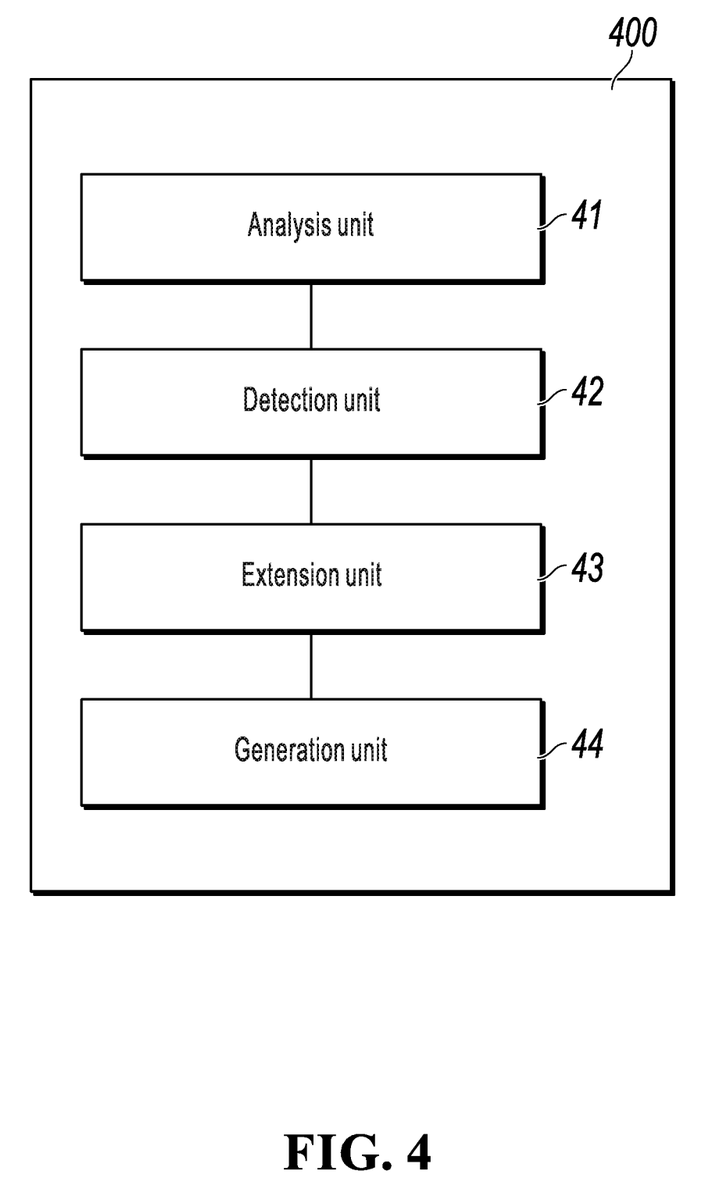
FIG. 4 is a schematic block diagram illustrating an apparatus for extending question and answer samples according to an implementation.

According to an implementation of another aspect, an apparatus for extending question and answer samples is further provided. FIG. 4 is a schematic block diagram illustrating an apparatus for extending question and answer samples according to an implementation. The following describes a structure of an apparatus 400 by using a first sample in question and answer samples as an example. The first sample includes a first question and a pre-marked first answer. As shown in FIG. 4, the apparatus 400 for extending question and answer samples includes the following: an analysis unit 41, configured to perform syntax analysis on the first question to determine a part of speech corresponding to each word in the first question; a detection unit 42, configured to generate a random number within a predetermined value range for the first sample, and detect whether the generated random number belongs to selected sample extension random numbers, where the sample extension random numbers are values selected from the predetermined value range and are used to select a corresponding sample from the question and answer samples for extension; an extension unit 43, configured to: when the generated random number belongs to the sample extension random numbers, delete a word with a predetermined part of speech in the first question to generate at least one extended question; and a generation unit 44, configured to generate each extended sample based on the at least one extended question and the first answer.

According to an implementation, a proportion of a quantity of sample extension random numbers to a quantity of values within the predetermined value range is predetermined.

According to an implementation, the extension unit 43 is further configured to delete any one of words with the predetermined part of speech from the first question.

According to an implementation, the part of speech of a word involved in the syntax analysis process includes but is not limited to at least one of the following: a noun, a verb, a verb phrase, and an interrogative.

According to an implementation, the predetermined part of speech involved when the extension unit deletes a word can include but is not limited to one of a noun and an interrogative.

In a possible design, the generation unit 44 can be further configured to combine each extended question with the first answer to generate each extended sample.

In another possible design, the generation unit 44 can be further configured to detect whether other extended questions of the question and answer samples include an extended question the same as the first extended question; and if there is an extended question the same as the first extended question, mark a first extended answer for the first extended question based on a predetermined template to generate a first extended sample.

It is worthwhile to note that the apparatus 400 shown in FIG. 4 is an apparatus implementation corresponding to the method implementation shown in FIG. 2. Corresponding descriptions in the method implementation shown in FIG. 2 are also applicable to the apparatus 400. Details are omitted here for simplicity.

According to an implementation of another aspect, a computer-readable storage medium is further provided, where the computer-readable storage medium stores a computer program, and a computer performs the method described in FIG. 2 when the computer program is executed on the computer.

According to an implementation of still another aspect, a computing device is provided, where the computing device includes a memory and a processor, the memory stores executable code, and the processor implements the method described in FIG. 2 when executing the executable code.

A person skilled in the art should be aware that in the previous one or more examples, functions described in the implementations of the present specification can be implemented by hardware, software, firmware, or any combination of hardware, software, and firmware. When the functions are implemented by software, the functions can be stored in a computer-readable medium or transmitted as one or more instructions or code in the computer-readable medium.

The objectives, technical solutions, and benefits of the technical concepts of the present specification are further described in detail in the previously described specific implementations. It should be understood that the previous descriptions are merely specific implementations of the technical concepts of the present specification, but are not intended to limit the protection scope of the technical concepts of the present specification. Any modification, equivalent replacement, or improvement made based on the technical solutions of the implementations of the present specification shall fall within the protection scope of the technical concepts of the present specification.

What is claimed is:

1. A computer-implemented method for extending question and answer samples, wherein the question and answer samples comprise a first sample, the first sample comprises a first question and a pre-marked first answer, and the method comprises:
   performing syntax analysis on the first question to determine a part of speech corresponding to each word in the first question including a first word corresponding to a first part of speech;
   generating a random number within a predetermined value range for the first sample, and detecting whether the generated random number belongs to selected sample extension random numbers, wherein the selected sample extension random numbers are values selected from the predetermined value range and are used to select a corresponding sample from the question and answer samples for extension;
   responsive to detecting the generated random number belongs to the selected sample extension random numbers, deleting the first word corresponding to the first part of speech to generate one or more extended questions;
   in response to generating the one or more extended questions, generating an extended sample based on the one or more extended questions and the pre-marked first answer;
   training a question and answer model using the extended sample; and
   generating output of the trained question and answer model to provide a response to a user question.

2. The computer-implemented method of claim 1, wherein a proportion of a quantity of the selected sample extension random numbers to a quantity of values within the predetermined value range is predetermined.

3. The computer-implemented method of claim 1, wherein deleting the first word corresponding to the first part of speech comprises:
   deleting any one of words with the first part of speech from the first question.

4. The computer-implemented method of claim 1, wherein the first part of speech comprises at least one of the following: a noun, a verb, a verb phrase, and an interrogative.

5. The computer-implemented method of claim 1, wherein the first part of speech comprises one of a noun and an interrogative.

6. The computer-implemented method of claim 1, wherein the generating the extended sample based on the one or more extended questions and the pre-marked first answer comprises:
   combining each extended question of the one or more extended questions with the pre-marked first answer to generate the extended sample.

7. The computer-implemented method of claim 1, wherein questions extended from the first question comprise a first extended question, and generating the extended sample based on the one or more extended questions and the pre-marked first answer comprises:
   responsive to detecting an extended question within the question and answer samples that matches the first extended question, marking a first extended answer for the first extended question based on a predetermined template to generate a first extended sample.

8. A non-transitory, computer-readable medium storing one or more instructions executable by a computer system to perform operations for extending question and answer samples, wherein the question and answer samples comprise a first sample, the first sample comprises a first question and a pre-marked first answer, and the operations comprise:
   performing syntax analysis on the first question to determine a part of speech corresponding to each word in the first question including a first word corresponding to a first part of speech;
   generating a random number within a predetermined value range for the first sample, and detecting whether the generated random number belongs to selected sample extension random numbers, wherein the selected sample extension random numbers are values selected from the predetermined value range and are used to select a corresponding sample from the question and answer samples for extension;
   responsive to detecting the generated random number belongs to the selected sample extension random numbers, deleting the first word corresponding to the first part of speech to generate one or more extended questions;

in response to generating the one or more extended questions, generating an extended sample based on the one or more extended questions and the pre-marked first answer;

training a question and answer model using the extended sample; and generating output of the trained question and answer model to provide a response to a user question.

9. The non-transitory, computer-readable medium of claim 8, wherein a proportion of a quantity of the selected sample extension random numbers to a quantity of values within the predetermined value range is predetermined.

10. The non-transitory, computer-readable medium of claim 8, wherein deleting the first word corresponding to the first part of speech comprises:

deleting any one of words with the first part of speech from the first question.

11. The non-transitory, computer-readable medium of claim 8, wherein the first part of speech comprises at least one of the following: a noun, a verb, a verb phrase, and an interrogative.

12. The non-transitory, computer-readable medium of claim 8, wherein the first part of speech comprises one of a noun and an interrogative.

13. The non-transitory, computer-readable medium of claim 8, wherein the generating the extended sample based on the one or more extended questions and the pre-marked first answer comprises:

combining each extended question of the one or more extended questions with the pre-marked first answer to generate the extended sample.

14. The non-transitory, computer-readable medium of claim 8, wherein questions extended from the first question comprise a first extended question, and generating the extended sample based on the one or more extended questions and the pre-marked first answer comprises:

responsive to detecting an extended question within the question and answer samples that matches the first extended question, marking a first extended answer for the first extended question based on a predetermined template to generate a first extended sample.

15. A computer-implemented system for extending question and answer samples, wherein the question and answer samples comprise a first sample, the first sample comprises a first question and a pre-marked first answer, and the system comprises:

one or more computers; and one or more computer memory devices interoperably coupled with the one or more computers and having tangible, non-transitory, machine-readable media storing one or more instructions that, when executed by the one or more computers, perform one or more operations comprising:

performing syntax analysis on the first question to determine a part of speech corresponding to each word in the first question including a first word corresponding to a first part of speech;

generating a random number within a predetermined value range for the first sample, and detecting whether the generated random number belongs to selected sample extension random numbers, wherein the selected sample extension random numbers are values selected from the predetermined value range and are used to select a corresponding sample from the question and answer samples for extension;

responsive to detecting the generated random number belongs to the selected sample extension random numbers, deleting the first word corresponding to the first part of speech to generate one or more extended questions;

in response to generating the one or more extended questions, generating an extended sample based on the one or more extended questions and the pre-marked first answer;

training a question and answer model using the extended sample; and generating output of the trained question and answer model to provide a response to a user question.

16. The computer-implemented system of claim 15, wherein a proportion of a quantity of the selected sample extension random numbers to a quantity of values within the predetermined value range is predetermined.

17. The computer-implemented system of claim 15, wherein deleting the first word corresponding to the first part of speech comprises:

deleting any one of words with the first part of speech from the first question.

18. The computer-implemented system of claim 15, wherein the first part of speech comprises at least one of the following: a noun, a verb, a verb phrase, and an interrogative.

19. The computer-implemented system of claim 15, wherein the generating the extended sample based on the one or more extended questions and the pre-marked first answer comprises:

combining each extended question of the one or more extended questions with the pre-marked first answer to generate the extended sample.

20. The computer-implemented system of claim 15, wherein questions extended from the first question comprise a first extended question, and generating the extended sample based on the one or more extended questions and the pre-marked first answer comprises:

responsive to detecting an extended question within the question and answer samples that matches the first extended question, marking a first extended answer for the first extended question based on a predetermined template to generate a first extended sample.

* * * * *